(12) United States Patent
Seynaeve

(10) Patent No.: US 6,511,059 B2
(45) Date of Patent: Jan. 28, 2003

(54) ANTIVIBRATION DEVICE AND MECHANICAL ASSEMBLY COMPRISING SUCH ANTIVIBRATION DEVICE

(75) Inventor: Stephane Seynaeve, Grand Rapids, MI (US)

(73) Assignee: Paulstra CRC, Grand Rapids, MI (US)

( * ) Notice: Subject to any disclaimer, the term of this patent is extended or adjusted under 35 U.S.C. 154(b) by 0 days.

(21) Appl. No.: 09/846,630

(22) Filed: May 1, 2001

(65) Prior Publication Data

US 2002/0163113 A1 Nov. 7, 2002

(51) Int. Cl.$^7$ ................................................ B60K 5/12
(52) U.S. Cl. .................. 267/140.13; 248/635; 248/638; 267/141; 267/153
(58) Field of Search ................................ 267/153, 141, 267/140.3, 136, 140.11; 248/635, 638, 634, 562, 615

(56) References Cited

U.S. PATENT DOCUMENTS 6,270,051 B1 * 8/2001 Power ........................ 248/636
6,298,936 B1 * 10/2001 Yoshida ................. 267/140.11
6,349,918 B1 * 2/2002 Bunker ........................ 248/635

OTHER PUBLICATIONS

Blueprint of the Truck Chassis Installation Manual of the Ford Explorer, with exploded views of the right and left brackets of the engine; 2002 Ford V152 Explorer Illustration Book.

* cited by examiner

Primary Examiner—Matthew C. Graham
(74) Attorney, Agent, or Firm—Marshall, Gerstein & Borun

(57) ABSTRACT

Antivibration device comprising an antivibration mount fastened to a vehicle chassis and a motor bracket fastened to a vehicle motor. The motor bracket includes two branches each having a downwardly open housing which fits on a corresponding ear of the antivibration mount. The branches of the motor bracket are secured to the ears of the antivibration mount through screws which extend at an angle of 45° relative to the horizontal.

13 Claims, 3 Drawing Sheets

ANTIVIBRATION DEVICE AND MECHANICAL ASSEMBLY COMPRISING SUCH ANTIVIBRATION DEVICE

FIELD OF THE INVENTION

The invention relates to antivibration devices and to mechanical assemblies including such devices.

More particularly, the invention relates to an antivibration device including:

an antivibration mount having a first rigid strength member designed to be fastened to a vehicle chassis, a second rigid strength member and an elastomer body interposed between said first and second strength members, said elastomer body being designed to withstand a permanent compression effort in a vertical direction and to damp vibrations at least in said vertical direction, said second strength member including two lateral ears which protrude laterally from said elastomer body and which are pierced respectively by two parallel holes;

and a motor bracket extending between a first end which is designed to be fastened to a vehicle motor and a second end which is designed to be fastened to said ears by screwing.

BACKGROUND OF THE INVENTION

In known antivibration devices of this type, the second end of the motor bracket is fastened to the ears of the second strength member by means of a screw which extends horizontally.

Since this screw is fastened inside the motor compartment of the vehicle after the motor (already fastened to the motor bracket) has been positioned in said compartment, the fastening of this screw is uneasy and therefore lengthy and costly.

Furthermore, the motor bracket does not bear on the second strength member before the fastening of the screw, which renders more difficult the process of assembling the motor bracket to antivibration mount.

OBJECTS AND SUMMARY OF THE INVENTION

A particular object of the present invention is to remedy these drawbacks by providing an antivibration device of the kind in question which is simpler, cheaper and easier to assemble than the known antivibration devices.

To this end, according to the invention, the second end of the motor bracket includes two parallel branches each having a reception housing which is open downward, said reception housings being designed to receive respectively the two lateral ears of the second strength member of the antivibration mount, and each of said branches having a hole which is designed to register with the hole of the corresponding ear to receive a fastening screw when the motor bracket is assembled to the antivibration mount. Thanks to these dispositions, the motor bracket bears on the antivibration mount as soon as said motor bracket is positioned on said mount, even before fastening the screws, which eases the assembling process.

Further, the direction of the holes of the branches of the motor bracket and of the ears of the antivibration mount enables an easy access for fastening the screws in said holes.

In preferred embodiments of the antivibration device according to the invention, one may possibly use in addition one and/or other of the following arrangements:

the holes of the branches of the motor bracket and of the ears of the antivibration mount are oriented in a direction extending slantwise, upwardly away from the first end of the motor bracket;

each reception housing is delimited at least by first and second secant upper receiving surfaces diverging downward, the first receiving surface sloping downward toward the first end of the motor bracket and the second receiving surface extending substantially perpendicular to the direction of the holes, and each ear of the antivibration mount including first and second bearing surfaces having complementary shapes to said first and second receiving surfaces;

the reception housings of the motor bracket are further delimited respectively by two lateral receiving surfaces which diverge slantwise in a direction opposite to the first end of the motor bracket, said lateral receiving surfaces being designed to be in contact respectively with the two ears of the antivibration mount opposite the elastomer body;

the reception housings are open toward each other;

the first receiving surface of each reception housing includes a protruding lip and the corresponding ear of the antivibration mount fits between said lateral receiving surface and said lip;

the hole of each ear of the antivibration mount is threaded;

the first end of the motor bracket includes a fastening plate including fastening holes designed to receive screws for fastening said motor bracket to the motor;

the first strength member of the antivibration mount has a rigid yoke extending around said elastomer body between the ears of the second strength member, said yoke being designed to de positioned between said two branches of the motor bracket;

the direction of the holes of the branches of the motor bracket and of the ears of the antivibration mount makes an angle of between 30° and 60° with a horizontal direction.

Another object of the present invention is a mechanical assembly comprising:

a vehicle motor;

a vehicle chassis;

an antivibration mount having a first rigid strength member fastened to the vehicle chassis, a second rigid strength member and an elastomer body interposed between said first and second strength members, said elastomer body withstanding a permanent compression effort in a vertical direction and being designed to damp vibrations at least in said vertical direction, said second strength member including two lateral ears which protrude laterally from said elastomer body and which are pierced respectively by two parallel holes;

and a motor bracket extending between a first end which is fastened to a vehicle motor and a second end which is fastened to said ears by screwing;

wherein the second end of the motor bracket includes two parallel branches each having a reception housing which is open downward, said reception housings receiving respectively the two lateral ears of the second strength member of the antivibration mount, and each of said branches having a hole which registers with the hole of the corresponding ear, two fastening screws traversing respectively said holes of the branches of the motor bracket and being received in said holes of the ears, the holes of the branches of the motor bracket and of the ears of the antivibration mount being oriented in a direction extending slantwise upwardly away from the first end of the motor bracket.

In preferred embodiments of the mechanical assembly according to the invention, one may possibly use in addition one and/or other of the following arrangements:

each reception housing is delimited at least by first and second secant upper receiving surfaces diverging downward, the first receiving surface sloping downward toward the first end of the motor bracket and the second receiving surface extending substantially perpendicular to the direction of the holes, and each ear of the antivibration mount including first and second bearing surfaces having complementary shapes to said first and second receiving surfaces;

the reception housings of the motor bracket are further delimited respectively by two lateral receiving surfaces which diverge slantwise in a direction opposite to the first end of the motor bracket, said lateral receiving surfaces being in contact respectively with the two ears of the antivibration mount opposite the elastomer body.

BRIEF DESCRIPTION OF THE DRAWINGS

Other characteristics and advantages of the invention appear from the following detailed description of one of its embodiments, given by way of non-limiting example, and with reference to the accompanying drawings.

In the drawings:

In the various figures, the same references denote identical or similar elements.

FIGS. 1 and 2 of the drawings show a mechanical assembly including:

Figure 1:
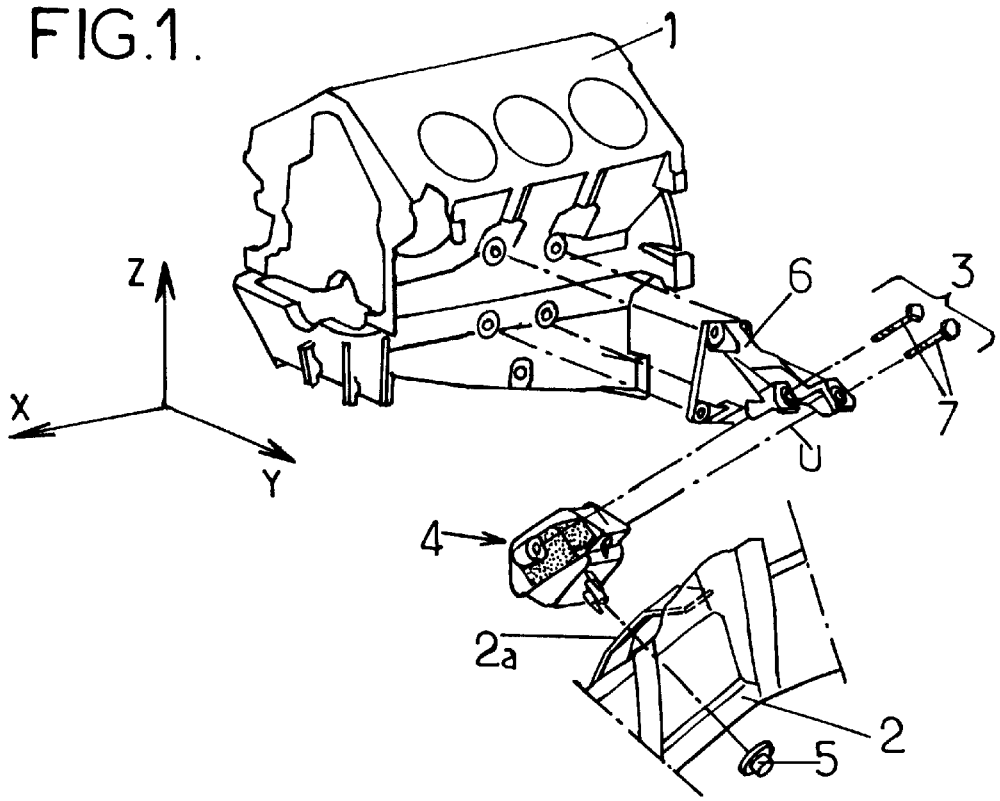
FIG. 1 is a perspective exploded view of a mechanical assembly including an antivibration device according to an embodiment of the invention.

a vehicle motor 1, which in the example shown in the drawings extends longitudinally in the longitudinal direction X of the vehicle, a vehicle chassis 2, and at least two antivibration devices 3 connecting the motor 1 to the chassis 2 on both sides of the motor, in a transversal direction Y of the vehicle.

More particularly, each antivibration device 3 includes, on the one hand, an antivibration mount 4 which is fastened for instance through at least a nut 5 on a slantwise rigid plate 2a belonging to the chassis 2, and on the other hand, a motor bracket 6. The motor bracket 6 is fastened to the motor 1 through horizontal screws (not shown) extending in the Y direction and said motor bracket 6 is fastened to the antivibration mount 4 through two screws 7 extending longitudinally in a slantwise direction U which extends upwardly and away from the motor 1.

Figure 2:
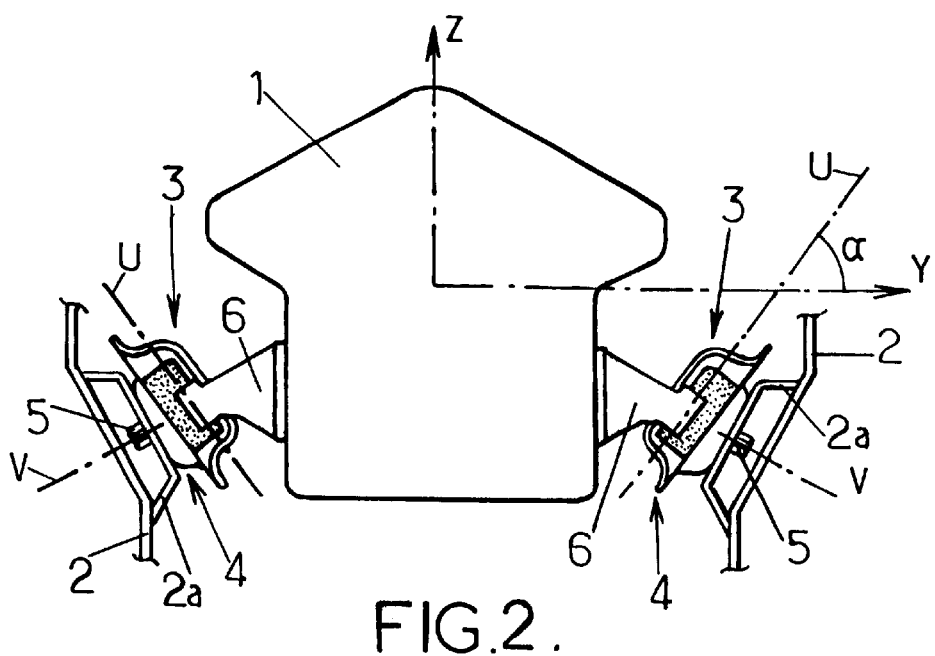
FIG. 2 is a face elevation view of the mechanical assembly of FIG. 1.

As shown on FIG. 2, the direction U of the screws 7 may form for instance an angle α with the Y direction which may lie between 30° and 60° and which may advantageously be substantially equal to 45°.

Figure 3:
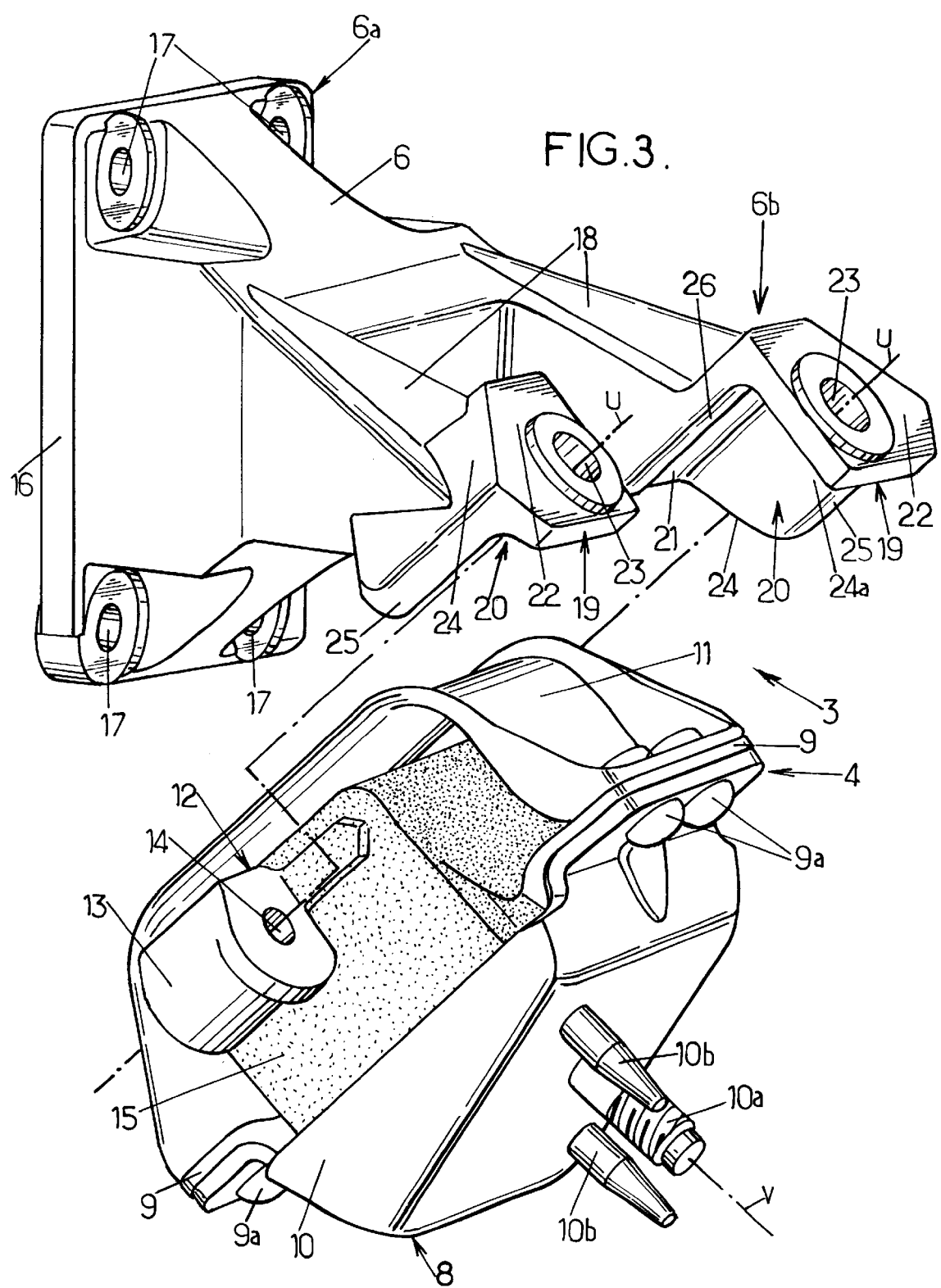
FIG. 3 is a perspective view of the antivibration device of FIG. 1.

As shown in more details on FIG. 3, the antivibration mount 4 includes a first rigid, metallic strength member 8 which, in the example shown in the drawings, comprises:

a central portion 9 having two lateral tabs extending in the X direction, a lower cup shaped portion 10, which may include for instance a threaded pin 10a on which is screwed said nut 5 and to non-threaded pins 10b penetrating in corresponding holes of said slantwise plate 2a when the lower portion 10 is fastened to plate 2a, and an upper yoke 11 which extends in a vertical mean plane parallel to the Y direction, at a distance above the central portion 9 and the lower portion 10 of the first strength member.

The three portions 9, 10, 11 of the first strength member 8 are rigidly assembled together, for instance through bolts or rivets 9a traversing the lateral tabs of the central portion 9.

Besides, the antivibration mount 4 further includes a second rigid, metallic strength member 12 which extends substantially perpendicular to the mean vertical plane of the yoke 11, between two lateral ears 13 protruding laterally on both sides of said yoke 11.

Each ear 13 includes a threaded hole 14 extending in said U direction and in which as screwed one of said screws 7.

Finally, the antivibration mounts 4 also includes an elastomer body 15 which is overmolded on the central portion 9 of the first strength member and on the second strength member 12, the two ears 13 of the second strength member protruding laterally from said elastomer body.

The elastomer body 15 is adapted to extend the permanent compression efforts due to the weight of the motor 1, and to damp vibrations in the vertical direction Z (FIG. 1).

Figure 4:
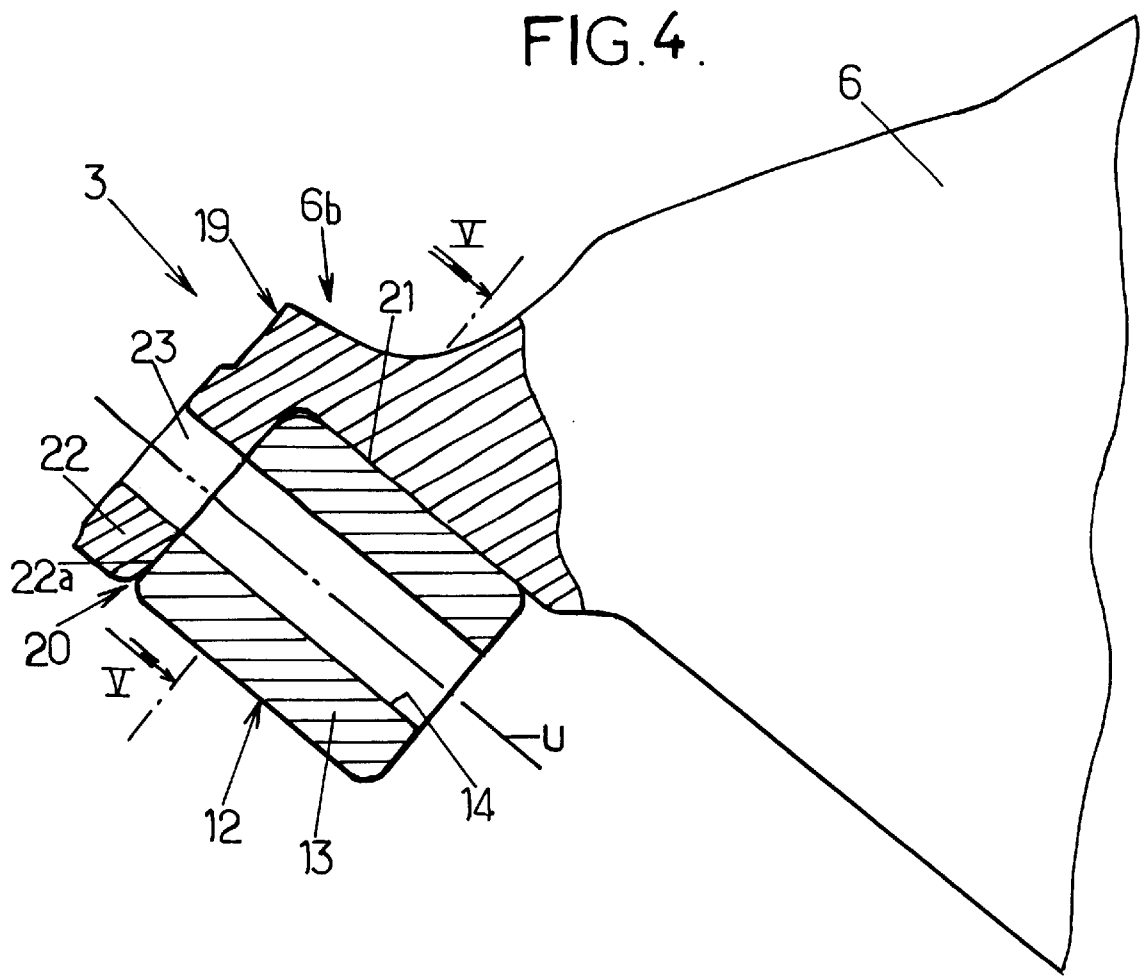
FIG. 4 is a partial vertical section view of the antivibration device of FIG. 3.
Figure 5:
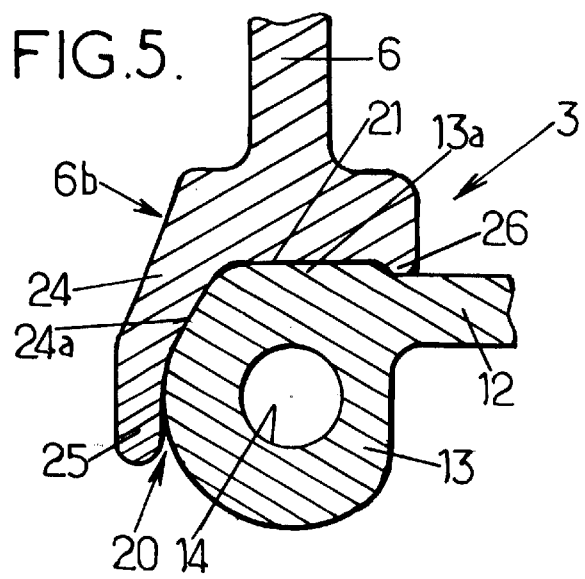
FIG. 5 is a section view taken along line V—V of FIG. 4.

Besides, as shown in FIGS. 3, 4 and 5, the motor bracket 6, which may be for instance molded in a single piece out of aluminium alloy, extends longitudinally between a first end 6a and a second end 6b, substantially in the Y direction.

The first end 6a of the motor bracket includes a vertical fastening plate 16 which is pierced by horizontal fastening holes 17 extending in the Y direction to receive screws (not shown) for fastening the motor bracket 6 to the motor 1, before mounting the motor on the vehicle chassis 2.

Besides, the second end 6b of the motor bracket includes two parallel branches 18 extending substantially in the Y direction as far on both sides of the yoke 11, as two ends 19.

Each end 19 forms a reception housing 20, which is open downward and which fits on a respective ear 13 of the antivibration mount 8, said reception housings 20 and ears 13 having substantially complementary shapes.

Each reception housing 20 of the motor bracket 6 is delimited by:

a first upper receiving surface 21 which slopes downward toward the first end 6a of the motor bracket, substantially parallel to said U direction, said first receiving surface 21 being substantially perpendicular to a vertical plane including said Y direction, and upper wall 22 which as substantially perpendicular to said U direction and which is traversed by a hole 23 in register with hole 14 of the corresponding ear 13, said upper wall defining a second upper receiving surface 22a of the reception housing 20, said second upper receiving surface being secant to said first receiving surface 21, and itself perpendicular to the U direction, and a lateral wall 24 which extends slantwise and which defines a lateral receiving surface 24a in lateral contact with the corresponding ear 13 of the antivibration mount, the lateral receiving surfaces 24a of the two branches 18 of the motor bracket diverging away from each other toward the antivibration mount 4 and being positioned on both sides of the ears 13.

In the example shown on the drawings, each lateral wall 24 is further extended toward the antivibration mount 4 by an end portion 25 which extends in a vertical plane parallel to the Y direction.

Further, in the example shown in the drawings, the two reception housings 20 of the branches 18 of the motor bracket are open towards each other.

Advantageously, the first receiving surface 21 of each housing 20 may include a protruding lip 26 extending substantially parallel to said U direction, each corresponding ear 13 of the antivibration mounts further including a protruding portion 13a which fits between said lateral receiving surface 24a and said protruding lip 26.

Thanks to these dispositions, when the motor brackets 6, fastened in advance to the motor 1, are positioned on their respective antivibration mounts 8 already fastened to the vehicle chassis 2, the slantwise receiving surfaces 21, 22a, 24a guide the motor bracket 6 and the motor so as to obtain a perfect positioning of said motor brackets, with their holes 23 in register with the holes 14 of the antivibration mounts.

Further, as soon as the motor brackets 6 have been fitted on the ears 13 of the antivibration mounts, the motor 1 and the motor brackets 6 are supported by the antivibration mounts, so that there is no need for any additional external supporting means after this positioning.

Finally, once the motor brackets 6 have been fitted on the ears 13 of the antivibration mounts, the screws 7 may be easily screwed in the holes 23, 14, since the screwing direction U enables an easy access for the operator or the robot which has to fasten the motor 1 to the chassis 2.

I claim:

1. An antivibration device including:
   and antivibration mount having a first rigid strength member, a second rigid strength member and an elastomer body interposed between said first and second strength members, said second strength member including two lateral ears which protrude laterally from said elastomer body and which are pierced respectively by two parallel holes;
   and a motor bracket extending between a first end and a second end;
   wherein the second end of the motor bracket includes two parallel branches each having a reception housing which is open downward;
   and wherein each of said branches has a hole.

2. Antivibration device according to claim 1, wherein the holes of the branches of the motor bracket and of the ears of the antivibration mount are oriented in a direction extending slantwise, upwardly away from the first end of the motor bracket.

3. An antivibration device according to claim 1, wherein each reception housing is delimited at least by first and second secant upper receiving surfaces diverging downward, the first receiving surface sloping downward toward the first end of the motor bracket and the second receiving surface extending substantially perpendicular to the direction of the holes, and each ear of the antivibration mount including first and second bearing surfaces having complementary shapes to said first and second receiving surfaces.

4. An antivibration device according to claim 3, wherein the reception housings of the motor bracket are further delimited respectively by two lateral receiving surfaces which diverge slantwise in a direction opposite to the first end of the motor bracket, said lateral receiving surfaces being designed to be in contact respectively with the two ears of the antivibration mount opposite the elastomer body.

5. An antivibration device according to claim 4, wherein the reception housings are open toward each other.

6. An antivibration device according to claim 5, wherein the first receiving surface of each reception housing includes a protruding lip and the corresponding ear of the antivibration mount fits between said lateral receiving surface and said lip.

7. An antivibration device according to claim 1, wherein the hole of each ear of the antivibration mount is threaded.

8. An antivibration device according to claim 1, wherein the first end of the motor bracket includes a fastening plate including fastening holes designed to receive screws for fastening said motor bracket to the motor.

9. An antivibration device according to claim 1, wherein the first strength member of the antivibration mount has a rigid yoke extending around said elastomer body between the ears of the second strength member, said yoke being designed to de positioned between said two branches of the motor bracket.

10. An antivibration device according to claim 1, wherein the direction of the holes of the branches of the motor bracket and of the ears of the antivibration mount makes an angle of between 30° and 60° with a horizontal direction.

11. A mechanical assembly comprising:
    a vehicle motor;
    a vehicle chassis;
    an antivibration mount having a first rigid strength member fastened to the vehicle chassis, a second rigid strength member and an elastomer body interposed between said first and second strength members, said elastomer body withstanding a permanent compression effort in a vertical direction and being designed to damp vibrations at least in said vertical direction, said second strength member including two lateral ears which protrude laterally from said elastomer body and which are pierced respectively by two parallel holes;
    and a motor bracket extending between a first end which is fastened to a vehicle motor and a second end which is fastened to said ears by screwing;
wherein the second end of the motor bracket includes two parallel branches each having a reception housing which is open downward, said reception housings receiving respectively the two lateral ears of the second strength member of the antivibration mount, and each of said branches having a hole which registers with the hole of the corresponding ear, two fastening screws traversing respectively said holes of the branches of the motor bracket and being received in said holes of the ears, the holes of the branches of the motor bracket and of the ears of the antivibration mount being oriented in a direction extending slantwise upwardly away from the first end of the motor bracket.

12. A mechanical assembly according to claim 11, wherein each reception housing is delimited at least by first and second secant upper receiving surfaces diverging downward, the first receiving surface sloping downward toward the first end of the motor bracket and the second receiving surface extending substantially perpendicular to the direction of the holes, and each ear of the antivibration mount including first and second bearing surfaces having complementary shapes to said first and second receiving surfaces.

13. A mechanical assembly according to claim 12, wherein the reception housings of the motor bracket are further delimited respectively by two lateral receiving surfaces which diverge slantwise in a direction opposite to the first end of the motor bracket, said lateral receiving surfaces being in contact respectively with the two ears of the antivibration mount opposite the elastomer body.

* * * * *